United States Patent
Cheng et al.

(10) Patent No.: US 7,440,436 B2
(45) Date of Patent: Oct. 21, 2008

(54) SELF-ORGANIZING MULTI-CHANNEL MESH NETWORK

(75) Inventors: Alexander L. Cheng, Scarsdale, NY (US); Zhifeng Tao, Brooklyn, NY (US)

(73) Assignee: Natural Lighting Systems, Inc.

( * ) Notice: Subject to any disclaimer, the term of this patent is extended or adjusted under 35 U.S.C. 154(b) by 539 days.

(21) Appl. No.: 11/129,128

(22) Filed: May 13, 2005

(65) Prior Publication Data

US 2006/0268791 A1    Nov. 30, 2006

(51) Int. Cl.
H04Q 7/24 (2006.01)
(52) U.S. Cl. .................. 370/338; 370/345; 370/310; 370/347; 370/445; 455/512; 455/453
(58) Field of Classification Search .............. 370/310, 370/328, 338–351, 395.21, 395.31, 395.42, 370/406, 445–447; 455/422.1, 435.3, 443–453, 455/512, 524; 709/200, 240, 242
See application file for complete search history.

(56) References Cited

U.S. PATENT DOCUMENTS

| | | | | |
|---|---|---|---|---|
| 5,563,883 A | * | 10/1996 | Cheng | 370/449 |
| 5,953,312 A | * | 9/1999 | Crawley et al. | 370/218 |
| 6,028,857 A | * | 2/2000 | Poor | 370/351 |
| 7,016,328 B2 | * | 3/2006 | Chari et al. | 370/331 |
| 2002/0042274 A1 | * | 4/2002 | Ades | 455/445 |
| 2003/0145092 A1 | * | 7/2003 | Funato et al. | 709/229 |
| 2004/0166883 A1 | * | 8/2004 | Kim et al. | 455/512 |
| 2004/0258033 A1 | * | 12/2004 | Heinonen et al. | 370/338 |
| 2005/0089001 A1 | * | 4/2005 | Nishikawa | 370/338 |
| 2005/0208949 A1 | * | 9/2005 | Chiueh | 455/452.2 |
| 2006/0019673 A1 | * | 1/2006 | Yagyu et al. | 455/454 |
| 2006/0133272 A1 | * | 6/2006 | Yuan et al. | 370/230 |
| 2006/0215556 A1 | * | 9/2006 | Wu et al. | 370/230 |
| 2006/0256742 A1 | * | 11/2006 | Lee et al. | 370/278 |
| 2006/0280152 A1 | * | 12/2006 | Lee et al. | 370/338 |
| 2007/0147248 A1 | * | 6/2007 | Kodialam et al. | 370/235 |

\* cited by examiner

Primary Examiner—Kamran Afshar

(57) ABSTRACT

A system for self-organizing and auto-configuring mesh networks is disclosed. Special nodes (deemed special for their topological significance) are used as a starting point for forming clusters of fully connected nodes. Here, all nodes can communicate directly with one another and links are scheduled to meet the traffic requirements as indicated by their individual configuration and topological positions. Links that do not interfere with each other are scheduled to operate concurrently, thereby increasing the bandwidth offered by the whole system. When there is change to the system, such as leaving or introduction of a node, the system will adjust with minimum impact on its operation. Once all of the clusters are formed in a system, the clusters are now capable of inter-cluster communications with an increase in bandwidth for such communications.

19 Claims, 6 Drawing Sheets

Legend:
- △n  Mesh AP equipped with n radio (node)
- ◯  Cluster
- ⌷  Data source
- ▭  Data sink
- ○  Portal to WAN
- ▬  Wireless link between clusters
- ──  Optional wireless link between clusters
- $A_1$  Node A in cluster 1
- $L_{12}$  Inter-cluster link between cluster 1 and 2 (primary or $B_1A_2$ if there's a possibility of ambiguity)

Number of channels available (L) = 10

Scheduled Channel Timing Sequence

Cluster 1

Cluster 2

Cluster 3

Cluster 4

SELF-ORGANIZING MULTI-CHANNEL MESH NETWORK

FIELD OF THE INVENTION

The present invention relates to communication systems, and more specifically to a method, system and apparatus for communication over a mesh network. In particular, the present invention discloses a collection of communicating nodes to self-organize and auto-configure themselves to form a system supporting communication requirements as indicated by the configuration of each node.

BACKGROUND OF THE INVENTION

With the introduction of the Public Switched Telephone Network, the following data networks were developed: Local Area Networks (LANs), which typically use Ethernet technology within a single location; Metropolitan Area Networks (MANs), which typically use optical fiber technology for communication within a larger area such as a city; and Wide Area Networks (WANs), where communication is spread over an even greater area, such as a country. Now by using radio technologies, wireless equivalents of these fixed-wire networks have been developed. These wireless equivalents are especially useful with the transmission of broadband services. Such a wireless equivalent is typically called a Wireless Local Area Network (WLAN).

WLANs use electromagnetic airwaves (radio and infrared) to communicate information from point to point without the need for a physical connection. The data being transmitted is superimposed or modulated on the radio wave (also known as a radio carrier) and the data will be extracted at the receiving end. The transmitter/receiver (transceiver) device, called an access point (AP), connects to the wired network from a fixed location and receives, buffers, and transmits data between the wired network and the WLAN. A single access point can support a small group of users. Access points can extend the range of independent WLANs by acting as a repeater, and can potentially double the distance between wireless systems or computers.

The last few years have witnessed an explosive growth of IEEE 802.11 WLANs. From all indications, this growth is expected to continue at exponential rates. From university campuses, business offices, homes, to airport lounges, coffee shops and other public/private locations, untethered Internet access is prevalent, thanks to the widely deployed WLANs.

One of the most logical progressions for WLANs is to have a structured organization of access points, and the communication between these access points can be flexibly implemented via either wired or wireless mediums. This will result in better coverage of a service area and improved coordination among access points. The majority of today's WLANs, nevertheless, are based on isolated deployment of "hot spot" topology, where each access point serves as a dumb gateway between the mobile devices associated with it and the rest of the Internet. Only a limited number of multi-AP topology has been deployed, using a hodgepodge of technologies without the desired system performance.

Meanwhile, the market demand for a networking technology covering an area with a collection of communicating nodes, commonly called mesh network, is beginning to take shape. Mesh networks are multi-hop systems in which communicating nodes assist each other in transmitting packets through the network. Instead of using the current "hub and spoke" model of wireless communications, where a base station connected to an Internet Service Provider, via satellite or a landline, connects to customers through a rooftop antenna (which can be overburdened at times), the mesh network automatically creates a wireless loop for any devices that are close to one another. In such a system, data can hop from one part of the network to another part of the network. However, a concern with mesh network arrangements is the creation of unwanted traffic on the wireless network and bandwidth management. It would be desirable to provide a mesh network system that overcomes these deficiencies.

Further, various governmental agencies around the world have initiated projects for metropolitan area coverage using WLAN technologies and many institutions are exploring similar network deployments. Service providers anticipate that this technology will offer a significant opportunity for a profitable service model.

Not surprisingly, the IEEE 802.11 standard-making body recognizes the market need for metropolitan area coverage by using WLAN technologies and thus has formed a task group, called TGs, for investigating mesh networks. TGs expects some of the benefits of such mesh networks to include easier deployment, more efficient spectral reuse, better Quality of Service (QoS) support, and improved system management. To date, TGs has identified a number of usage models (including residential, office, campus, and temporary public work areas), categorized functionalities and carved out the scope of the standardization work. Currently TGs is soliciting technical proposals for this standard-making process.

Presently, the IEEE 802.11 standard carves up its operating spectrum into a number of channels, however, these channels are not used simultaneously in a system for increased bandwidth. At startup, access points scan the operating spectrum and use the first available channel for communication. Even when the interference of the communication channel becomes high, access points will reduce the modulating scheme (lower data rate) instead of switching to another channel.

Accordingly, a novel technology is needed to meet the challenges outlined above. The present invention provides an architectural framework for mesh networks, which incorporates a novel algorithm for network discovery, organization, channel assignment and reassignment. Over this framework, other enhancements can be incorporated while interoperability with higher layer protocols is maintained.

Further objects and advantages of the present invention will become apparent from a consideration of the drawings and ensuing description thereof.

DISCUSSION OF PRIOR ART

Although the prior art discloses many types of systems and technologies covering WLANs, none of the prior art addresses the solution disclosed in the present invention. Some of the prior art includes: *Data and Computer Communications* 7th Edition by William Stalling, Prentice Hall, May 2003, provides background knowledge of communication systems. *Graphs and Algorithms* by M. Gondran and M. Minoux, John Wiley & Sons, March 1984, provides extensive information related to graphs and network designs.

There have been many systems taking advantage of diversity provided by multiple channels for increased bandwidth. Examples of such systems are found in U.S. Pat. No. 6,480,497, U.S. Pat. No. 6,775,305, U.S. Pat. No. 6,751,187, U.S. Pat. No. 6,498,821 and U.S. Patent Application Pub. No. 2004/0185887. Several inventions deal with improving system performance with multiple channels, such as U.S. Pat. No. 6,275,497, which describes a system with multiple channels to be assigned from contention, and various polling protocols according to user load and status. U.S. Pat. No. 5,576, 702 discloses a method for fault-tolerant transmission by monitoring activities and retransmission on a shared medium. U.S. Pat. No. 6,490,297 describes a method to use any one of a multi-channel link to be used for transmission of control signal. U.S. Patent Application Pub. No. 2005/0063328 discloses a method for channel hopping to improve system bandwidth.

There are also a number of patents that deal with automatically provisioning and self-organizing networks. For example, U.S. Pat. No. 4,912,656 deals with satellite communication with emphasis on maintaining tri-connection for each node. U.S. Pat. No. 6,243,585 deals with hierarchical arrangement of nodes in a network where nodes are mobile. U.S. Pat. No. 6,870,816 discloses a method for adjusting transmission operation in order for a network to self-heal. U.S. Pat. No. 5,081,623 provides a network with a number of channels, where more than two nodes can communicate on one of the channels by using a common token passing control channel, thereby establishing a logical sub-network. U.S. Pat. No. 6,510,141 describes a protocol for link auto-configuration in a dynamic synchronous transfer mode network, allowing for the network to switch between ring and bus topology. U.S. Pat. No. 6,788,650 organizes nodes in clusters in a hierarchical tree arrangement while assigning addresses to facilitate routing. U.S. Pat. No. 6,414,955 uses ranging and distributed calculation to identify interference and communication neighbors in the process of learning of topology. U.S. Pat. No. 6,460,128 provides method and apparatus for exchanging information in a mesh network. U.S. Patent Application Pub. No. 2005/0063319 discloses a method and apparatus for channel assignment in a hierarchical fashion. U.S. Patent Application Pub. No. 2002/0186665 discloses a method of learning a path through the network when changes occur. U.S. Patent Application Pub. No. 2004/0003111 provides a method for self-organizing a network in a cluster tree structure. U.S. Patent Application Pub. No. 2005/0074019 discloses a method for providing mobile inter-mesh communication in a multi-level organization.

In addition to well-known algorithms, there are many patents dealing with routing methods. U.S. Pat. No. 6,456,588 discloses a method for taking advantage of a hypercube structure in routing and fault restoration. U.S. Pat. No. 6,873,618 deals with a method to forward multicast packets in a meshed network. U.S. Pat. No. 6,704,301 describes a method using beacons originated from a server and propagated via broadcast to the clients for learning their connectivity back to the server. U.S. Pat. No. 6,028,857 describes a method using cost parameter in a message in routing through an ad-hoc network. U.S. Patent Application Pub. No. 2003/0235158 uses spanning tree backbone for organizing and routing through a network of nodes. U.S. Patent Application Pub. No. 2004/0018839 provides a protocol for of self-organizing a network of a control node and others. U.S. Patent Application Pub. No. 2004/0170151 provides a routing exchange method for a dynamic network of nodes.

In the research community, the general problem of multi-channel medium access control has also been studied. A. Raniwala et al., "Architecture and Algorithms for an IEEE 802.11-Based Multi-Channel Wireless Mesh Network" Proceedings of IEEE InfoCom 2005, proposes a multi-channel wireless mesh network architecture, which attempts to address both the channel assignment and the related routing problems. For routing, the reference discloses a forwarding scheme based upon the spanning tree algorithm used for layer 2 bridging, and elects the node that has direct physical connection to the wired network (a.k.a. portal) to be the root of the tree. Regarding channel assignment, the reference mainly focuses on the scenario where each node in the network is equipped with at least two radios. Thus, at least one radio can be dedicated to the upstream parent, and the other to the downstream children, respectively. The corresponding radios at the upstream parent and at the downstream children that talk to each other should be tuned into the same channel, which is determined by the upstream parent. Even though the proposed scheme is simple, it only targets a specific topology configuration (i.e., tree) and imposes the constraint on the number of radios needed at each node (i.e., equal or greater than 2). Several other MAC proposals disclosed in (1) Y. Liu, E. Knightly; "Opportunistic Fair Scheduling over Multiple Wireless Channels"; Proceedings of IEEE INFOCOM 2003; (2) J. So, N. Vaidya; "Multi-Channel MAC for Ad Hoc Networks: Handling Multi-Channel Hidden Terminals Using A Single Tranceiver"; Proceedings of ACM MobiHOC 2004; and (3) A. Nasipuri, S. Das; "A Multichannel CSMA MAC Protocol for Mobile Multihop Networks"; Proceedings of IEEE WCNC 1999, have been made to support multi-channel networks. The approach taken by most of this body of research is to find an optimal channel for a single packet transmission, essentially avoiding interference and enabling multiple parallel transmissions in a neighborhood. This approach requires a channel switching on a packet-by-packet basis, which severely restricts the applicability of the proposed MAC protocols. In K. Sundaresan, R. Sivakumar, M. Ingram, and T. Chang; "A Fair Medium Access Control Protocol for Ad-Hoc Networks with MIMO Links"; Proceedings of IEEE INFCOM 2004, the reference discloses a medium access control (MAC) protocol for an ad hoc network with multiple input multiple output (MIMO) links. To take full advantage of MIMO links, this MAC protocol attempts to use graph coloring techniques to assign different channels to those MIMO links that potentially will interfere with each other. The proposed scheme solely concentrates on a particular physical layer technology (i.e., MIMO), and hence its applicability to a wider range of network types is severely impaired.

Traditional cellular networks rely on spectrum reuse as a means to cover a large geographic area with a limited number of channels. In a cellular network, system components are stationary and organized in a hierarchical fashion. The connection between cell sites and switching center is fixed. On the contrary, mesh networks are distributed in nature with transient nodes for certain applications. Most importantly, the mesh network of the present invention preferably does not require fixed wired connections between nodes. The benefit of having dynamic connections between nodes will become apparent in the upcoming discussion. And IEEE 802.11 TGs provides a wealth of context information in a number of documents, such as the IEEE 802.11-04/1174r13: TGs Functional Requirements and Scope, IEEE 802.11-04/662r11: TGs Usage Models etc. See also (1) IEEE 802.11-04/54r2, PAR for IEEE 802.11s ESS Mesh and (2) IEEE 802.11-04/56r1, Five Criteria for IEEE 802.11s ESS Mesh.

SUMMARY OF THE INVENTION

The present invention discloses a method, system and apparatus for Self-Organizing a Multi-Channel Mesh Network.

In the present invention, this can be accomplished by using the spare spectrum (e.g., available communication channels) to increase bandwidth in a self-organizing process resulting in a system meeting the requirements of a mesh network. The central idea is to carve up the system into a number of clusters.

Within each cluster, all nodes can communicate directly with one another, and communication links are established for each and every pair of nodes in this cluster.

A fully connected network provides direct links between every pair of nodes, thereby offering the best network performance within the cluster, in terms of the number of hops among possible network topologies. Some nodes with special topological significance, e.g., WAN connectivity (called "portal"), data source/sink attachment or connection to other clusters (called "edge node"), normally have more traffic moving through them than other nodes. Therefore, within the limits of available channels, the disclosed system attempts to maximize the coverage of clusters centered around these special nodes.

These special nodes can take precedence in this cluster forming stage preferably in a certain order. In a preferred embodiment, this precedence order is preset, e.g., the priority of portal is higher than that of a source, which is in turn higher than that of a sink. That is, if we use Pri(c(t)) to denote the priority assigned to the type of nodes c at time instance t, the precedence relationship holds for the example above: Pri (WAN(t))>Pri(Source(t))>Pri(Sink(t))>Pri(Edge(t)). It's possible to adjust the precedence order depending on the time of day to suit the dominant activity at that time, e.g., given that batch download of media files is prevalent early in the morning, higher precedence can be assigned to the source, where the media server is attached. Furthermore, this precedence relationship can be adjusted depending on the resulting topology. For example, an edge node, which can be located between a source and a sink node, shall have higher priority than these sink and source nodes. The traffic source and sink nodes can be further refined into different priority classes based on the nature of their contents. For this reason, data as a general term can be used to denote these source and sink nodes.

Following the formation of a cluster, an edge node is selected to reach out to other nodes belonging to the adjacent or non-adjacent clusters. Taking into account the capabilities of each node and its topological significance, the disclosed algorithm establishes communication links between clusters. As a result, the whole system settles into a topology accustomed to the system conditions and requirements.

In each cluster, all nodes can communicate directly with one another. However, depending on the capabilities of each node, most notably the number of radios for each node and the capability of performing channel switching on each particular radio, the communication links are either permanently established or scheduled using a number of scheduling policies.

When the number of radios present is less than the links required to connect to neighbors, connection between nodes will have to be time-shared via a scheme, called channel hopping. Node 'hops' from one channel to the other channel by adjusting its radio components to tune to the particular frequency associated with the target channel. Channel hopping can be scheduled based on the following policies:

Round-robin,
Fixed order/frequency based on traffic requirements (recurring rate, frame size), or
To be directed by routing-table and other system knowledge.

Once the scheduling is decided, at each time "slot" a pair of nodes will 'rendezvous' in the same channel with one of this pair transmitting to the other. Each node has to queue up messages destined for certain nodes for scheduled time slots.

In addition to the channels reserved for pair-wise communication, one channel, called common channel, is allocated for broadcast/multicast, control, and node introduction. To avoid conflict, adjacent clusters have to reserve different channels for communications including the common control channel. This is akin to the classical coloring problem in the graph theory.

Instead of making drastic changes to the system whenever a node is introduced, the present system preferably delays the system-wide drastic reset to result in minimum impact on system operation. At a certain time of day, e.g., quiescent period early in the morning, the system can re-establish its network topology from a fresh start taking into account the accumulated changes since the last update, if still necessary.

The protocols used for routing and transmission can be streamlined to take advantage of the resulting network topology and system knowledge. For example, routing is straightforward since the path between any pair of nodes is determined during the self-organizing process. Actually some backup link is identified during this process. Efficiency of the transmission protocol over communication channel between any pair of directly connected nodes can be improved by taking into consideration the fact that contention is eliminated.

Certainly there are many ways to connect nodes within a cluster. The present invention discloses a systematic approach using fully connected topology as a start before moving on with enhancements, as one embodiment. The present invention also contemplates at least the following ways to connect nodes in clusters:

A. Fully connected cluster;
B. Cluster groups with parallel channels (as disclosed in U.S. patent application Ser. No. 09/523,185);
C. Re-enforced link(s);
D. Directional antenna; and
E. Hybrid connection.

Based on the algorithm associated with the self-organizing process of the present invention, the resulting system can provide added performance by adding link(s) and/or radio(s) to any architecture. This system design tool can be performed either pre- or post-installation. Because this calculation is performed offline, there's no impact on system performance or its operation. The criteria for comparison and performance analysis is preferably based on the following:

Maximum bandwidth increase,
Minimum delay,
Meeting/approaching traffic requirements,
Maximum traffic bearing capability,
Fault tolerance, and
Minimum impact on existing topology when change occurs.

When two links can operate simultaneously within the same cluster without interfering with each other, we call these links concurrent. Bandwidth increase is a direct result of operating these concurrent links at the same time.

A use of the algorithm of the present invention can be illustrated with the following example occurring within a cluster. For a cluster of N or (N+1) nodes, where N is even, there are $N(N-1)/2$ pairs of concurrent links. If there is one (1) radio equipped at every node, the number of channels required at any instance=$N/2$ or $(N-1)/2$ with $N/2$ or $(N-1)/2$ bandwidth improvement, when N is even or odd, respectively. On the other hand, if each node is equipped with $(N-1)$ radios, the number of channels required at any instance=$N(N-1)/2$ with $N(N-1)/2$ bandwidth improvement.

For example, with 4 nodes fully connected in a cluster, there are $4\times(4-1)/2=6$ links within this cluster and 3 pairs of links that can be used concurrently. There will be 2 times bandwidth improvement if each node has 1 radio. The bandwidth improvement increases to 6 times if each node has 3 radios. If each node has 2 radios, there is 4 times bandwidth improvement. In all of these examples, we assume that channel hopping is enabled, if necessary.

In summary, the present invention offers the following benefits:
Systematic channel assignment;
Self-organizing network topology;
Coordination among access points in a system;
Spectral reuse leading to bandwidth increase; and
Improved routing and communication protocols.

DETAILED DESCRIPTION OF PREFERRED EMBODIMENT

As required, detailed embodiments of the present invention are disclosed herein; however, it is to be understood that the disclosed embodiments are merely exemplary of the invention, which can be embodied in many forms.

Figure 1:
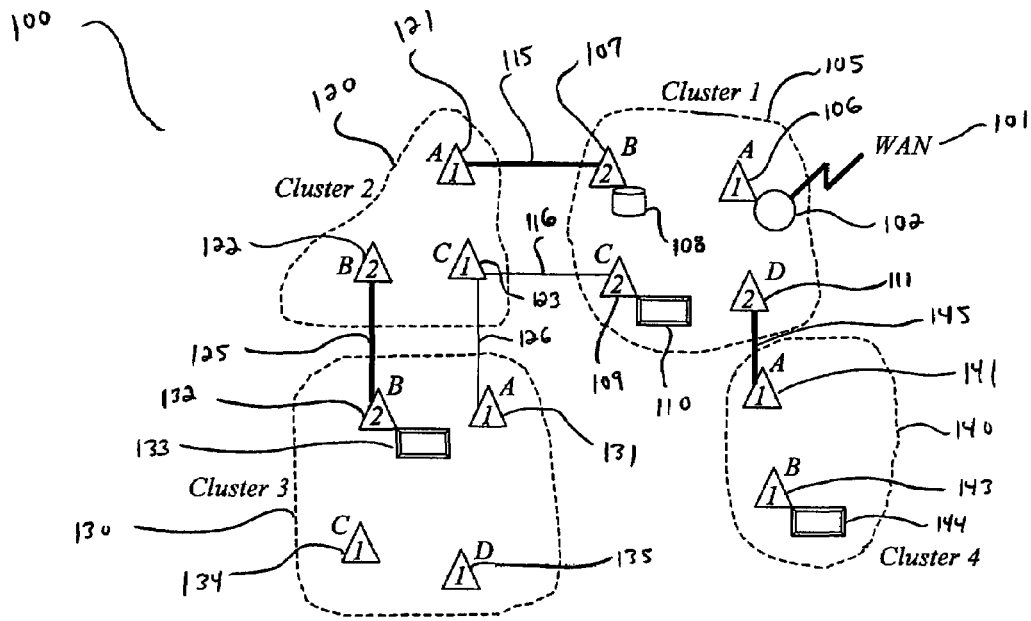
FIG. 1 depicts an exemplary system layout in which the preferred embodiment of the present invention may operate.

FIG. 1 is a system layout in which a preferred embodiment of the present invention may operate. A mesh network can be installed either on a permanent or a temporary basis. In certain situations, some of the nodes can be transient either due to its movement, failure or maintenance. Because of this possible change to the system, the configuration process is executed when change occurs in addition to configuration occurring at initial system startup. However, instead of configuring these nodes manually, it is desirable to have these nodes perform automatic configuration.

FIG. 1 illustrates a system layout of a preferred embodiment of the present invention. System 100 contains 4 clusters. Clusters can be added or subtracted depending on the system configuration. Cluster 1 (105) contains Node $A_1$ (106), Node $B_1$ (107), Node $C_1$ (109) and Node $D_1$ (111). Nodes are also known as access points, each of which can connect to the wired network and receive, buffer and transmit data between the wired network and the WLAN. In the example provided in FIG. 1, Node $A_1$ (106) is connected to the WAN (101) via portal (102). This connection can be accomplished by wiring to a DSL line, a dedicated line, cable modem, or other form of WAN connection. Alternative embodiments can include a wireless connection, such as WiMax or an equivalent. Although this example only shows Node $A_1$ being connected to a WAN, all of the nodes have that capability. In this example, Node $A_1$ (106) contains 1 radio (which is indicated by the number 1 appearing in the triangle), such that n=1 for Node $A_1$. Node $B_1$ (107) contains 2 radios (n=2), and is capable of connecting to a data source (108), or can receive data from that data source (108). Data source (108) is a storage device that stores many different types of multi-media data, such as music, photos, and video. It should be noted that any node is capable of connecting to a data source.

The significance of having multiple radios present at a node is to increase the number of wireless links that can communicate concurrently without interfering with each other.

Node $C_1$ (109) contains 2 radios (n=2), and is capable of connecting to a data sink (110), or can provide or transmit data to a data sink (110). A data sink (110) takes data and is capable of presenting, displaying or playing data that can be obtained from any source, including the data source (108). Examples of data sinks would be video monitors, display devices such as a television, and MP3 players. Node $D_1$ (111) is also included in Cluster 1 and contains 2 radios (n=2). Any node is capable of connecting to a data sink.

Cluster 2 (120) contains Node $A_2$ (121) with 1 radio (n=1), Node $B_2$ (122) with 2 radios (n=2), and Node $C_2$ (123) with 1 radio (n=1). Cluster 3 (130) contains Node $A_3$ (131) with 1 radio (n=1), Node $B_3$ (132) with 2 radios (n=2), Node $C_3$ (134) with 1 radio (n=1), and Node $D_3$ (135) with 1 radio (n=1). Node $B_3$ is illustrated as being connected to data source (133). Any node in any cluster can connect to a data source. Cluster 4 (140) contains Node $A_4$ (141) with 1 radio (n=1), and Node $B_4$ (143) with 1 radio (n=1). Node $B_4$ is illustrated as being connected to a data sink (144). Node $B_1$ (107) can communicate with Node $A_2$ (121) via wireless link (115). One of ordinary skill in the art will understand this to mean any type of wireless technology. Wireless link 125 provides communication functions similar to link 115, but now the wireless link exists between Cluster 2 (120) and Cluster 3 (130). Using this wireless link (115), not only will Node B be able to communicate with Node $A_2$, but it also provides a communication means for Cluster 1 (105) to communicate with Cluster 2 (120). Wireless link (116) provides an additional link for Cluster 1 (105) to communicate with Cluster 2 (120). This second wireless link (116) can be used to: provide an additional communication link, act as concurrent communication link, act as a back-up link if problems surface with communication link (115) between Cluster 1 (105) and Cluster 2 (120), for redundancy reasons to address load sharing issues, if link failure occurs or if interference occurs. Wireless link 126 provides a similar wireless link function between Cluster 2 (120) and Cluster 3 (130). One of ordinary skill in the art will understand these wireless links to mean any type of wireless technology.

The exemplary embodiment of FIG. 1 can operate as follows. The system (100) has ten (10) channels available for transmission (L=10). Therefore the number of nodes in a cluster is less than 5, which will become evident in the following explanation. Suppose N denotes the number of nodes in the cluster. To make all the nodes belonging to the cluster fully connected, we need N(N−1)/2 channels. Since we only have 10 channels, the maximum number of nodes in a cluster cannot exceed 4. Now, the system preferably starts from special node $A_1$ (106), which has connectivity to WAN (101). After Nodes $A_1$, $B_1$, $C_1$, and $D_1$, (106, 107, 109, and 111, respectively) discover that they can communicate with each other, Node $A_1$ informs these neighbors to form a cluster. The number of reachable nodes in this cluster is 4, which is less than the maximum allowed (5), leaving 10−4(4−1)/2=4 channels for other uses. The channel conservation scheme will be discussed shortly.

Also during the discovery phase, Node $B_1$ (107) discovers that it can reach Node $A_2$ (121), and Node $C_1$ (109) can reach Node $C_2$ (123). Therefore, Node $B_1$ (107) and Node $C_1$ (109) are candidates to be edge nodes to the adjacent Cluster 2 (120) with Node $B_1$ (107) taking precedence due to its special node priority and higher capability due to the presence of 2 radios. An edge node can be defined as the node in a cluster that permits easy information flow to an adjacent cluster. It is preferably that the edge node is located at the edge of a cluster such that it allows for the shortest communication distance between the clusters. After getting informed about the formation of Cluster 1 (105), Node $A_2$ (121) and Node $C_2$ (123) start to look for a cluster. There are two possibilities. One is Cluster 2 (120) can form and would consist of Node $A_2$ (121), Node $B_2$ (122), and Node $C_2$ (123), while the other possibility is a cluster formed by Node $B_2$ (122), Node $C_2$ (123), Node $A_3$ (131), and Node $B_3$ (132). In this example, Cluster 2 (120) was selected to consist of Node $A_2$ (121), Node $B_2$ (122), and Node $C_2$ (123) due to the higher priority of Node $A_2$ (121) derived from its adjacency to node $B_1$ (107).

Similarly, Node $A_3$ (131) and Node $B_3$ (132) are informed of the formation of Cluster 2 (120). After discovering that Nodes $A_3$ (131), $B_3$ (132), $C_3$ (134) and $D_3$ (135) can reach and communicate with one another, they form Cluster 3 (130) without any contending option.

With the remaining nodes, Node $B_4$ (143) can learn about the formation of Cluster 1 (105) from Node $D_1$ (111). Other nodes can also convey this information to Node $B_4$ (143). After the completion of this discovery process, Node $A_4$ (141) and Node $B_4$ (143) form Cluster 4 (140). After each cluster is formed in this exemplary embodiment, the auto-configuration process proceeds to select a scheduling pattern for channel hopping. First assume that a dedicated wired link from Node $A_1$ (106) to WAN (101) is provided. Since Node $A_2$ (121), Node $C_2$ (123) and Node $A_4$ (141) cannot dedicate a radio for inter-cluster link, there is no need to dedicate a radio from nodes in cluster 1 for inter-cluster communication. That is, inter-cluster links between cluster 1 (105) and cluster 2 (120), and cluster 1 (105) and cluster 4 (140) need to be scheduled in time. The creation of these clusters will be further explained in the description of the remaining diagrams.

Figure 2:
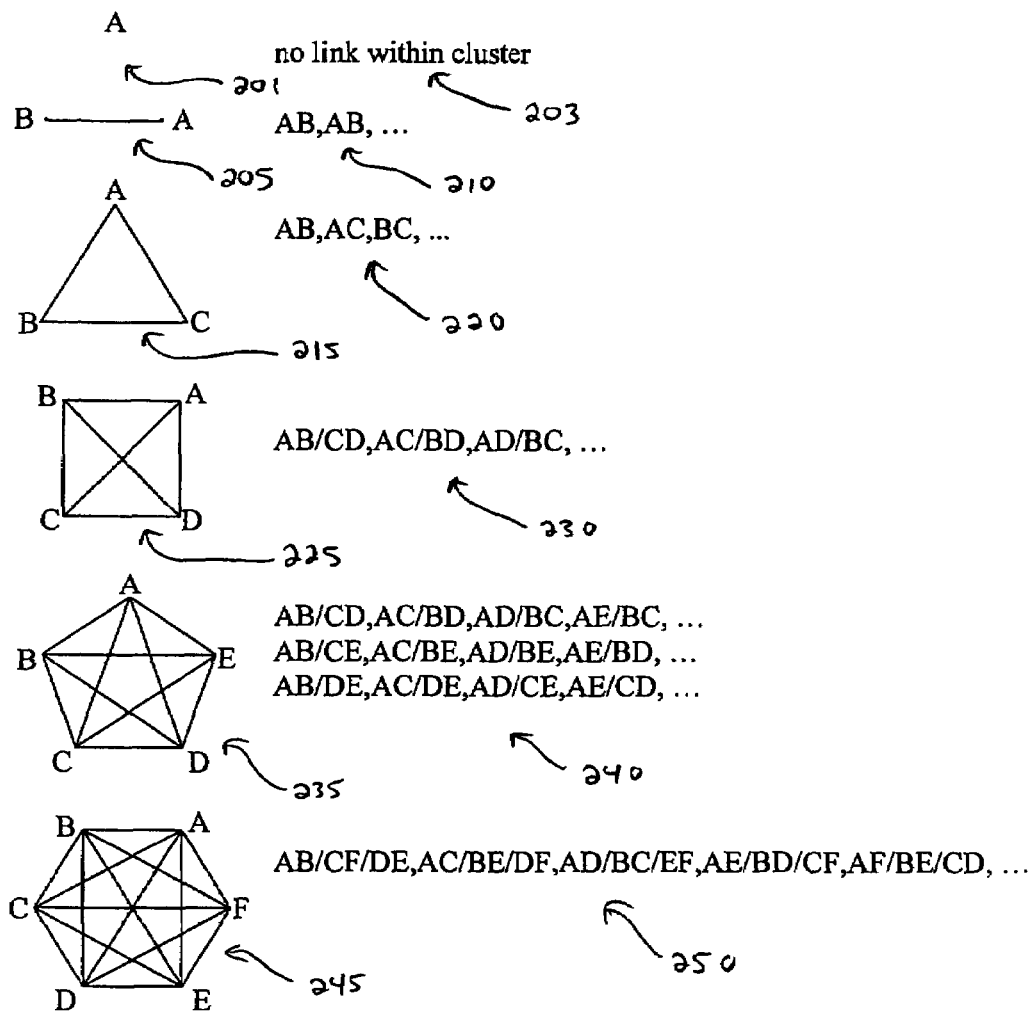
FIG. 2 illustrates fully connected clusters, each with a of different number of nodes.

FIG. 2 lists several fully connected clusters and their corresponding concurrent links. Note that when there are less radios than the number of neighbors at any node, preferably only a subset of the links are established at any time. This helps to conserve channels for other uses. Since not all channels are used in such a cluster, a proper scheduling can help conserve channels for other uses. For example, in the 4-node cluster, there are only 2 concurrent links that can be used at a given time if each node is equipped with only 1 radio. Therefore these concurrent links can be scheduled to use 2 out of 6 available channels, conserving 4 channels for other uses.

In this exemplary model of FIG. 2, the list of clusters starts with a cluster (201) having 1 node (A), such that there will be no intra-cluster links for this single node cluster (203). Cluster 205 contains 2 nodes (A and B), and the identified scheduling sequence is AB, AB (210). This sequence can repeat an infinite number of time slots. Cluster 215 contains 3 nodes (A, B, and C). One possible intra-cluster communication link is identified in 220 as AB, AC, BC. Here, the sequencing can repeat for an infinite number of time slots, but since there exists an additional node, the pattern can change for upcoming time slots. For example, the next sequence may be AC, BC, AB. These adjustments can be directed by traffic requirements in the network or because of network conditions. Cluster 225 contains 4 nodes (A, B, C and D). One possible intra-cluster communication link sequence is identified in 230. Now, due to the additional nodes, the sequence patterns that will continue over an infinite number of time slots can repeat in certain instances and will change in other instances. The varying or repetition of the resulting cluster sequence patterns will also occur in all of the remaining cluster examples in FIG. 2. Cluster 235 contains 5 nodes (A, B, C, D and E). Possible intra-cluster communication link sequences on separate lines are identified in 240. Cluster 245 contains 6 nodes (A, B, C, D, E and F). One possible intra-cluster communication link sequence is identified in 250. Chart 255 summarizes the possible connection scenarios presented in 201, 205, 215, 225, 235, and 245. For example, a cluster with 1 node will have zero neighbors per node, thus zero possible links, zero concurrent links with 1 radio per node, and zero number of concurrent links with N−1 radios per node. Another example can be illustrated with 6 nodes. In that case, N=6. The number of neighbors will be N−1=5, and the number of links that can be established between the 6 nodes is N(N−1)/2=15. The total number of concurrent links (links able to operate simultaneously without interfering with one another) with 1 radio per node is 3. And the total number of concurrent links with N−1 radios per node is 15. A similar analysis is performed for clusters with 2, 3, 4, or 5 nodes. Those results are shown in chart 255.

Figure 3A:
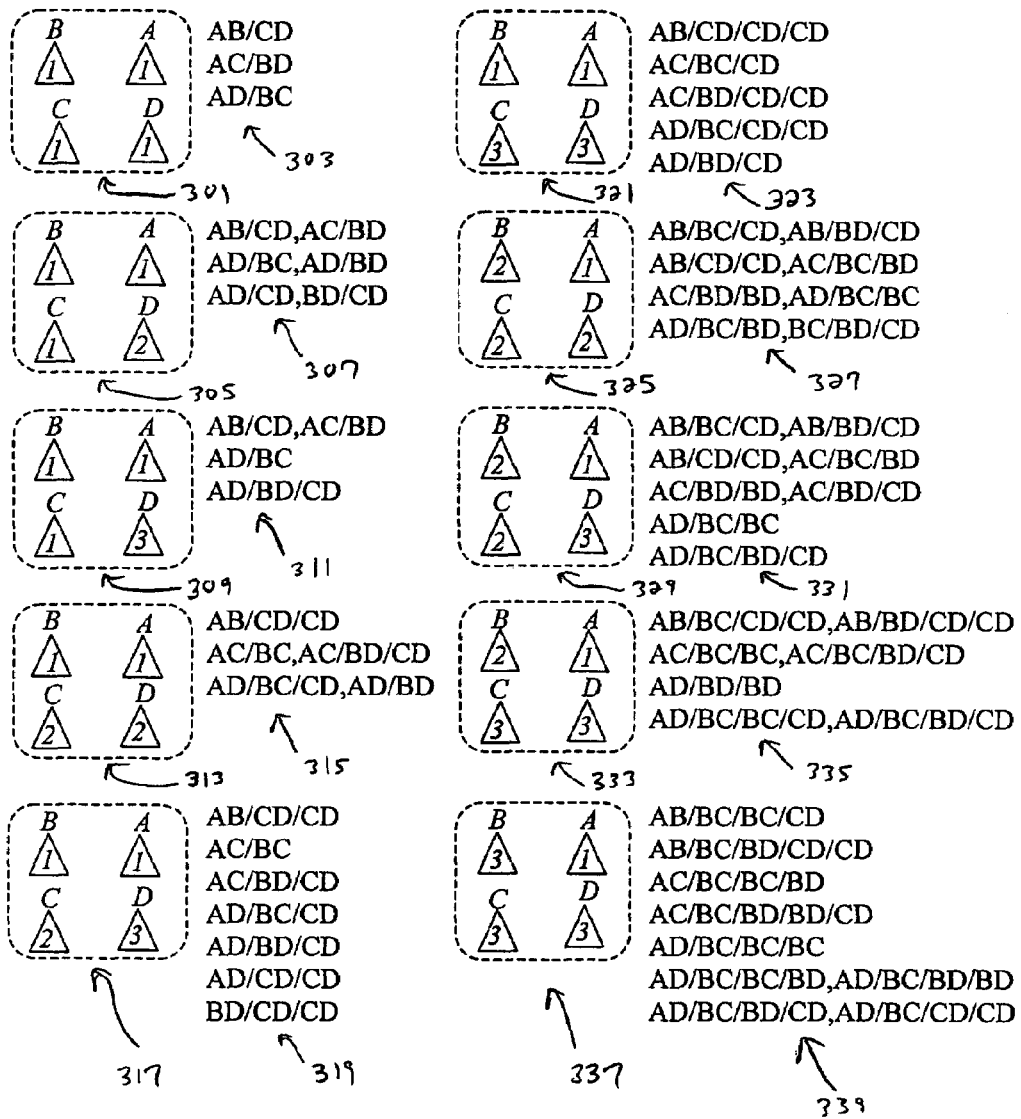
FIGS. 3A and 3B identify all possible combinations of radio configurations in a 4-node cluster with up to 3 radios for each node, with possible combinations of concurrent links.
Figure 3B:
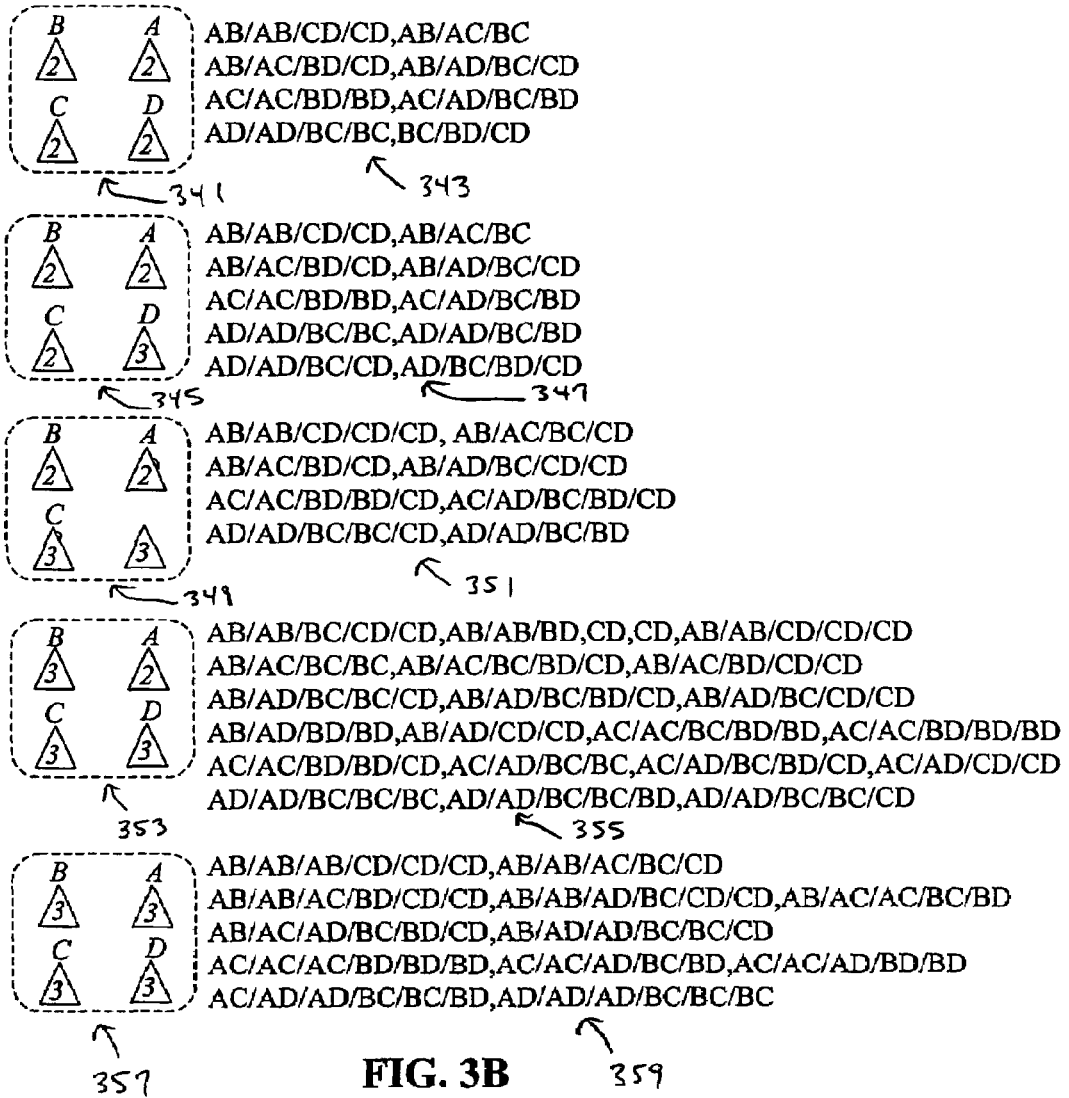

FIGS. 3A and 3B identify the possible combinations of radio configurations for the nodes in a 4-node cluster, with each node containing up to 3 radios. All possible combinations of concurrent links are identified next to the configuration separated by slashes. Different combinations are separated either by commas or listed on separate lines. Note that these combinations attempt to make best use of the radios whenever there's a possible link, so it will be included. However, some combinations have more concurrent links than the other combinations, indicating an increased bandwidth with more concurrent links. These scheduling patterns with increased bandwidth will be preferred during the scheduling phase. For example, in 1-1-1-3 configuration (309), scheduling pattern AD/BD/CD enables 3 concurrent links versus others with 2 concurrent links as listed in 311. Obviously, a node with 3 radios has enhanced capabilities and greater bandwidth compared to a node with 2 radios. Such enhancements include: the ability to transmit and/or receive an increased number of data streams, the ability to utilize a greater number of concurrent links, increase the system bandwidth, and increase the carrying capacity.

Some of the sequences demonstrate a possible remedy for greater traffic between 2 nodes than the carrying capacity of a channel by offering more than one link between a pair of nodes. For example, 2 nodes with additional radios can have parallel (concurrent) links due to the additional radios and additional channels, all of which can be accomplished without interference. Also note all radios are accounted for the intra-cluster communication identified in FIGS. 3A and 3B. Inter-cluster and WAN links (either dedicating additional radio or to be scheduled) will be considered in another figure.

Now turning to FIG. 3A, Cluster 301 contains 4 nodes (A, B, C and D). Each node has 1 radio. The possible sequencing patterns in this cluster are identified at 303 as AB/CD, AC/BD, and AD/BC. However, since each node only contains 1 radio, there can only be 2 concurrent links at any given time. E.g., link AB can be concurrent with link CD, and no other links will be concurrent at this time. In a subsequent time slot, link AC can be concurrent with link BD. Again, no other links will be concurrent in this time slot. Cluster 305 contains 4 nodes (A, B, C and D), however node D now has 2 radios. As a result, the possible sequencing patterns are identified at 307 as AB/CD, AC/BD, AD/BC, AD/BD, AD/CD, and BD/CD. Although node D has 2 radios, the potential number of concurrent links still remains as 2. Now turning to cluster 325, which is a cluster containing 4 nodes (A, B, C and D). However, nodes B, C, and D now each contain 2 radios. The resulting concurrent links are identified in 327 as AB/BC/CD, AB/BD/CD, AB/CD/CD, AC/BC/BD, AC/BD/BD, AD/BC/BC, AD/BC/BD, and BC/BD/CD. Here there are 8 sequencing patterns, and now the potential number of concurrent links has increased to 3 due to the increased number of radios. In cluster 329, Node A has 1 radio, Node B has 2 radios, Node C has 2 radios, and Node D has 3 radios. The sequences are identified in 331 as AB/BC/CD, AB/BD/CD, AB/CD/CD, AC/BC/BD, AC/BD/BD, AC/BD/CD, AD/BC/BC, and AD/BC/BD/CD. Having Node D contain 3 nodes will enable that node to transmit greater amounts of data, and this node will likely be a candidate for inter-cluster communications. Due to the increased number of radios, certain patterns in this sequence of 331 are capable of 3 concurrent links that can operate simultaneously without interference, while the other patterns are capable of 4 concurrent links that can operate simultaneously without interference. This is extremely significant when trying to improve system operation and increase bandwidth. A similar analysis is performed for the remaining clusters found in FIGS. 3A and 3B.

Figure 4:
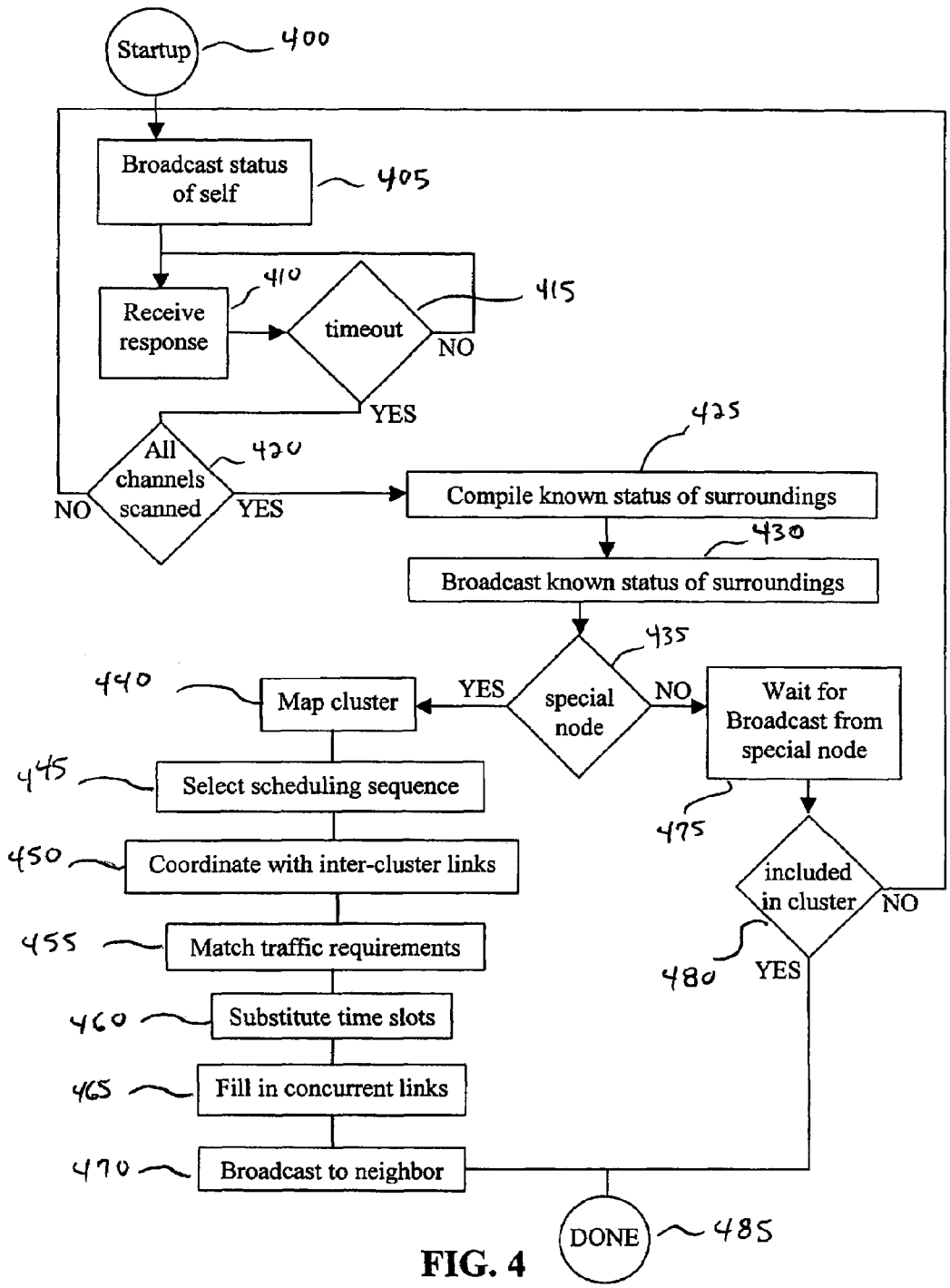
FIG. 4 is the algorithm flow chart for each node for the self-organizing and auto-configurating process.

FIG. 4 is a flowchart illustrating the algorithm performed for each node during the discovery process after system startup. In FIG. 4, at startup (step 400), a node will broadcast its individual configuration data (step 405). This configuration data may include number of radios, and availability of data sources or data sinks. During this broadcast step (405), the nodes are undergoing a discovery process to extract and exchange configuration information with neighbor nodes. After this broadcast step, the node waits to receive a response from its neighbor nodes (step 410). Once a response is received, a node is now able to determine which neighbor nodes are reachable and are able to communicate with this node (step 410). At this point, the node can go a timeout mode to wait for additional responses or wait for a first response if no responses have yet been received (step 415). If a response is received during a timeout (step 415), the process will move to step 420; if no response is received the process will return back to step 405 to rebroadcast its identifying information, or return to step 410 to wait for a response. At step 420, the node will determine if all channels have been scanned. If the response is no, the process returns back to step 405. If the response is yes, then the process proceeds to step 425. At step 425 the node will compile the known status of its surroundings (e.g., reachable nodes, node configuration information). At step 430, the node will broadcast the status information to its neighboring nodes. The types of broadcasted status information can vary. For example, the node may notify its neighbors that they are reachable and communication is possible. The node may also want to retransmit the configuration information back to the neighboring nodes. One of the main goals with step 430 is to confirm to the neighboring nodes that they are capable of establishing a communication link with this node. This communication link with these neighboring nodes is preferably a wireless one. If the broadcast is from a special node (step 435), the process proceeds to step 440 to map the cluster. If the broadcast is not from a special node (step 435), the process proceeds to step 475 to wait for a broadcast from a special node. Once the broadcast from a special node is received, the process moves to step 440 to determine whether the node is included in the cluster. If the answer is yes, the process is complete for this node. If the answer is no, the process returns to step 405 for the discovery process. Special nodes can include edge nodes, or nodes capable of receiving information from a portal, data source or data sink.

At step 440, a cluster is mapped. This cluster mapping is typically accomplished based on the location of this node and its neighboring nodes, and preferably is created starting with the special node. The cluster will be formed so that the nodes contained within the cluster can be fully connected, so that they can all communicate with each other. At step 445, the process selects a scheduling sequence based on the configuration of each nodes in the cluster. For a 4-node cluster, this selection process utilizes FIGS. 3A and 3B, where all possible sequencing patterns inca cluster are identified, and a sequence(s) is selected from these possibilities. At step 450, the process coordinates with inter-cluster links. This step 450 occurs once additional clusters have been formed. To coordinate, the system preferably schedules the multiple clusters in the same time slots to allow for proper communication for the inter-cluster links.

At step 455, traffic requirements are matched. At this step, the system determines which inter-cluster link will experience the greatest amount of inter-cluster traffic. This identified link will then be assigned to a greater number of time slots as compared to a link that is not as busy. Typically, a node with an increased number of radios will have the ability to transmit/receive more data than nodes with fewer radios, thus indicating higher traffic flow. A more detailed discussion concerning time slots will be provided with the discussion of FIG. 5. Next, at step 460, a time slot is substituted. Here, inter-cluster links or WAN links are introduced into the time slots, so that intra-cluster links are replaced with inter-cluster links or WAN links. This will be further discussed in FIG. 5, and more specifically with the discussion of $L_{12}$ and $L_{14}$. At step 465, the process fills in concurrent links to finalize the scheduling sequence. And at step 470, this information is broadcasted to neighbors (e.g., cluster configuration, schedules and links to other clusters). Once the information has been received from the neighboring clusters, the process proceeds to step 485 thus completing the process. The system preferably runs through the process identified in FIG. 4 for every node until the clusters are mapped.

In a preferred embodiment, once configuration information is gathered at each node in the steps identified above, the special node with the highest priority preferably will determine the coverage of the cluster (node composition of the cluster), and will notify its neighbors to provide information concerning the formation of the cluster (steps 400-485). An additional phase is to schedule channel hopping for intra-cluster links. The traffic requirements are taken into account to match the possible scheduling patterns. Then inter-cluster links are included, possibly substituting out some less useful intra-cluster links in the scheduling pattern. Finally, the common channel is scheduled in a regular interval. This can conclude the auto-configuration process for this cluster. Then the process propagates to nodes reachable by nodes already incorporated in clusters. Similarly, all nodes preferably will go through the self-organizing process followed by auto-configuration process. This configuration process is completed when all nodes are incorporated in a cluster.

In a rare case of insufficient channel availability for a configuration (e.g., many nodes are closely positioned), the number of nodes included in a cluster may have to be reduced. If a scheduling pattern is selected based on the prevailing activities at the time, then the system should be able to adjust for changes in traffic and other conditions. For example, in cluster 1 of FIG. 1 (with nodes A, B, C and D), the link $B_1C_1$ should get higher priority with regular attention during peak play time while link $A_1B_1$ should get higher priority during download. Therefore, AB/BC/CD, AC/BC/BD, and AD/BC/BD are selected to reflect the dominant traffic between $B_1$ and $C_1$ from possible combinations for the radio configurations (node A has 1 radio, while nodes B, C and D each have 2 radios). At any point in time, 3 channels are allocated for communication. One of these channels can be given the double duty for common communication. In this scheduling pattern, inter-cluster links preempt links of low traffic bearing requirements. For example, AC/BC/BD is changed to AC/BC/$L_{12}$ to avoid conflict with operation of node $D_1$. This is illustrated in cluster 1 of FIG. 5. Similarly, AD/BC/BD is changed to $L_{14}$/BC/BD in cluster 1 of FIG. 5. In turn, these scheduled time slots will have to be coordinated with the scheduling in cluster 2 and cluster 4. When cluster 1 is engaged in common channel communication, BC link is still possible without interference. Such link is included in the scheduling sequence to account for high traffic requirement between these 2 nodes.

Now we will consider an example by examining FIGS. 1 and 4. If during the discovery phase, node $B_1$ (in cluster 1) discovers that it can reach node $A_2$ (in cluster 2), and $C_1$ (in cluster 1) can reach $C_2$ (in cluster 2). Therefore, nodes $B_1$ and $C_1$ are candidates to be edge nodes to the adjacent cluster 2 with node $B_1$ taking precedence due to its special node priority (due to the presence of a data source and higher capability with 2 radios).

After getting informed about the formation of cluster 1, nodes $A_2$ and $C_2$ start to look for a cluster to join. There are two possibilities. One is cluster 2 consisting of node $A_2$, $B_2$, and $C_2$ and the other is a combination of nodes $B_2$, $C_2$, $A_3$ and $B_3$. The cluster 2 consisting of node $A_2$, $B_2$ and $C_2$ are chosen due to the higher priority of $A_2$ derived from its adjacency to node $B_1$. Again, the objective is to maximize the coverage of cluster of reachable nodes within the limit of the number of channels afforded.

If Nodes $B_2$ and $B_3$ each set aside one radio for inter-cluster link this will leave the scheduling pattern rather straightforward, i.e., AB,AC,BC, and inter-cluster link $L_{12}$ dictates the time slot and the channel used, resulting in 3 channels used in this cluster. This arrangement requires 2 additional channels in addition to the number of channels allocated to cluster 1, the total number of channels now.

Next, nodes $A_3$ and $B_3$ of cluster 3 are informed of the formation of cluster 2. After discovering that $A_3$, $B_3$, $C_3$ and $D_3$ can reach one another, they form cluster 3. The scheduling pattern is also quite straightforward, i.e., AB/CD,AC/BD, AD/BC. There are 3 channels used in this cluster. However, since this cluster is not adjacent to cluster 1, all the channels used in cluster 1 can be reused in cluster 3.

As for the remaining nodes, node $A_4$ learns about the formation of cluster 1 from node $D_1$. After completing the discovery process, nodes $A_4$ and $B_4$ form cluster 4. Again the choice of scheduling pattern is quite simple, that is AB. This arrangement with an additional inter-cluster link requires 2 channels. This configuration requires 1 channel in addition to what is allocated to cluster 1. The total number of channels is still within the allowable limit of channels, the system configuration is now established.

The process in FIG. 4 can operate as follows: Discovery at each node begins, where for each channel a node will broadcast its status, the node receives responses from its neighboring nodes, it proceeds to timeout mode to wait for additional responses and retries if no responses are received, it then compiles known status of surroundings, broadcasts the known status of surroundings. If a special node exists (portal, traffic source/destination, etc.) then map a cluster, where a max fully connected cluster takes precedence in the mapping, then broadcast this information to neighbor nodes and/or clusters. Otherwise the node waits for special node/neighbor's decision before mapping a cluster, again a max fully connected cluster takes precedence and information is broadcasted to its neighbors.

Figure 5:
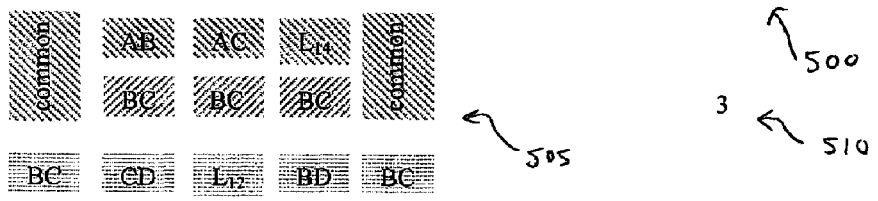
FIG. 5 illustrates potential timing sequences for all nodes in the system.
Figure 5:
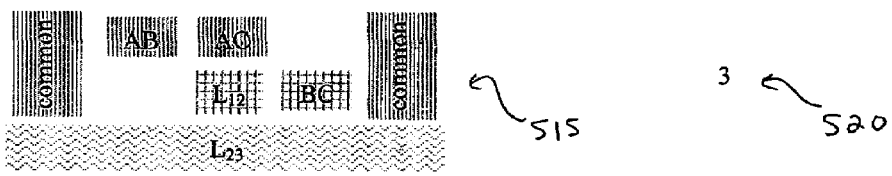
Figure 5:
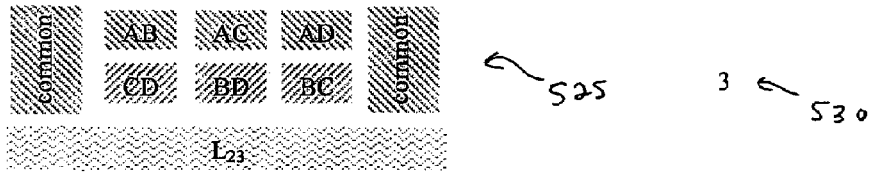
Figure 5:

FIG. 5 illustrates the resulting scheduled channel timing sequence. The time slot interval depends on the type of traffic to be carried. When a node is introduced into the system (e.g., a node introduced in the vicinity of cluster 2 or cluster 4), the easiest solution is to absorb this new node in an existing cluster. Depending on the location of this newly introduced node, association with an existing cluster may not be possible. In such case, a cluster needs to be rearranged. System-wide restart is delayed until a "quiet time" to minimize the impact of system operation. Also note that the system optimization can recommend an increase in the number of radios at nodes $A_2$ and $A_4$ to increase the sustainable throughput between inter-cluster links.

Sequence 505 of FIG. 5 illustrates a possible timing sequence at cluster 1 (initially set forth in FIG. 1) with the timing sequence moving from left to right. In cluster 1, three (3) channels are allocated for communication. The timing sequence begins with the first time slot carrying a common channel and the BC intra-cluster link of cluster 1. Here link BC and common communication share the first time slot (i.e., concurrent links operating at the same time). In the second time slot, the scheduling pattern carries the pattern of AB/BC/CD for the inter-cluster links of cluster 1. In the third time slot, inter-cluster link $L_{12}$ is now introduced into the timing sequence. Now, AC/BC/BD is changed to AC/BC/$L_{12}$ to avoid conflict with operation of node $D_1$. Similarly, AD/BC/BD is changed to $L_{14}$/BC/BD. In turn, these scheduled time slots will have to be coordinated with the scheduling in cluster 2 and cluster 4. When cluster 1 is engaged in common channel communication, BC link is still possible without interference. Such link is included in the scheduling sequence to account for high traffic requirement between these 2 nodes. Finally, the last time slot carries the common channel as well as the BC link to fill in the concurrent links.

The remaining portions of FIG. 5 illustrate possible timing sequences and the links carried in the various time slots. The number of channels used in each cluster is also identified.

From the foregoing, it will be observed that numerous variations and modifications may be effected without departing from the true spirit and scope of the novel concept of the invention. It should be understood that no limitation with respect to the specific structure and arrangements illustrated is intended or should be inferred. It is, of course, intended to cover by the appended claims all such modifications as fall within the scope of the claims.

Thus, in accordance with the present invention, a Self-Organizing Multi-Channel Mesh Network has been provided accomplishing all of the objects, and having the features and advantages specified at the beginning of this specification. It is to be understood that the disclosed construction of the invention may be embodied in other forms within the scope of the claims.

What is claimed is:

1. A method of self-organizing and auto-configuring a wireless network, comprising the steps of:
   a) providing multiple access points to a wireless network wherein each access point is configured to exchange information with at least one other access point;
   b) exchanging information between at least two access points;
   c) mapping a cluster of access points wherein all said access points communicate directly with one another based on information obtained from said information exchange between at least two said access points; and
   d) selecting a scheduling sequence for said access points contained in said cluster based on the information obtained from the exchange by
      1) assessing traffic require within said cluster; and
      2) matching scheduling patterns according to said requirements.

2. The method of self-organizing and auto-configuring a wireless network according to claim 1, wherein said mapping step comprises prioritizing said access points for cluster formation.

3. The method of self-organizing and auto-configuring a wireless network according to claim 2, wherein said prioritizing step is performed by assessing at least one of: whether said access points are connected to wide area network, the number of radios contained in said access points, said access points connection to an information source, or said access points connection to an information destination.

4. The method of self-organizing and auto-configuring a wireless network according to claim 1, wherein said exchange of information for cluster formation is used to determine:
   if two access points are communicating directly with one another, and configuration of at least one individual access point for wide area network connectivity, connection to an information source, connection to an information destination, or communication capability.

5. The method of self-organizing and auto-configuring a wireless network according to claim 1, wherein said step of selecting a scheduling sequence for communication between said access points comprises assessing traffic requirements within said cluster.

6. The method of self-organizing and auto-configuring a wireless network according to claim 1, further comprising the step of incorporating a new access point into said existing cluster by:
   a) exchanging information with said new access point;
   b) determining connectivity to said new access point;
   c) assessing the size of said cluster; and
   d) absorbing said new access point into said cluster.

7. The method of self-organizing and auto-configuring a wireless network according to claim 1, further comprising the step of incorporating a new access point into said cluster by:
   a) exchanging information with said new access point;
   b) determining connectivity to said new access point; and
   c) establishing connection between said new access points with at least one of said access points contained in said cluster.

8. A method of self-organizing and auto-configuring a wireless network, comprising the steps of:
   a) providing multiple access points to a wireless network wherein each access point is configured to exchange information with at least one other access point;
   b) exchanging information between at least two access points;
   c) mapping a first cluster of access points wherein all of said access points communicate directly with one another based on information obtained from said information exchange between at least two said access points;
   d) selecting a scheduling sequence for said access points contained in said first cluster;
   e) broadcasting status information to at least one of neighboring access points outside of said first cluster;
   f) receiving status information from at least one of said neighboring access points; and
   g) establishing one or more wireless communication links between said first cluster and at least one of said neighboring access points; and
   h) selecting a scheduling sequence for said first cluster to communicate with said neighboring access point by:
      1) assessing traffic requirements within said first cluster;
      2) receiving traffic requirements from said neighboring access point,
      3) assessing traffic requirements from said neighboring access point; and
      4) matching scheduling patterns according to said requirements.

9. The method of self-organizing and auto-configuring a wireless network according to claim 8, wherein said mapping step comprises prioritizing said access points for cluster formation.

10. The method of self-organizing and auto-configuring a wireless network according to claim 9, wherein said prioritizing step is performed by assessing at least one of: whether said access points are connected to wide area network, the number of radios contained in said access points, said access points connection to an information source, or said access points connection to an information destination.

11. The method of self-organizing and auto-configuring a wireless network according to claim 8, wherein said exchange of information for cluster formation is used to determine:
   if two access points are communicating directly with one another, and configuration of at least one individual access point for wide area network connectivity, connection to an information source, connection to an information destination, or communication capability.

12. The method of self-organizing and auto-configuring a wireless network according to claim 8, wherein said step of selecting a scheduling sequence for communications between said access points comprises assessing traffic requirements within said first cluster.

13. The method of self-organizing and auto-configuring a wireless network according to claim 8, wherein said receiving status information from said neighboring access point includes information on the ability of said access points to communicate with one another and the existence of a cluster where all access points are configured to communicate directly with one another and includes said neighboring access point.

14. A self-organizing auto-configuring wireless network system, comprising:
   a) a wireless network;
   b) multiple access points, each access point configured to exchange information with one another;
   c) a first cluster wherein all of said access points communicate directly with one another and is mapped from said information exchanged between said multiple access points;
   d) a second cluster mapped from information between a plurality of access points outside of said first cluster and at least one of said access points in said first cluster;
   e) a communication link between said first cluster and said second cluster, configured to communicate with at least one access point in said first cluster; and
   f) sequencing patterns to enable said first cluster to communicate with said second cluster, wherein said sequencing patterns are established by assessing traffic requirements within said first cluster, receiving traffic information from said second cluster assessing traffic requirements from said second cluster, and matching scheduling patterns according to said requirements.

15. A self-organizing auto-configuring wireless network system according to claim 14, further comprising sequencing patterns for said access points in said first cluster, wherein said sequencing patterns are determined from traffic requirements in said first cluster.

16. A method of self-organizing and auto-configuring a wireless network, comprising the steps of:

a) providing multiple access points to a wireless network wherein each access point is configured to exchange information with at least one other access point;
b) exchanging information between at least two access points;
c) mapping a cluster of access points wherein all said access points communicate directly with one another based on information obtained from said information exchange between at least two said access points;
d) selecting a scheduling sequence for said access points contained in said cluster based on the information obtained; and
e) incorporating a new access point into said existing cluster by:
   1) exchanging information with said new access point;
   2) determining connectivity to said new access point;
   3) assessing the size of said cluster; and
   4) absorbing said new access point into said cluster.

17. The method of self-organizing and auto-configuring a wireless network according to claim 16, wherein said mapping step comprises prioritizing said access points for cluster formation by assessing at least one of: whether said access points are connected to wide area network, the number of radios contained in said access points, said access points connection to an information source, or said access points connection to an information destination.

18. The method of self-organizing and auto-configuring a wireless network according to claim 16, wherein said exchange of information for cluster formation is used to determine:
   if two access points are communicating directly with one another, and configuration of at least one individual access point for wide area network connectivity, connection to an information source, connection to an information destination, or communication capability.

19. The method of self-organizing and auto-configuring a wireless network according to claim 16, wherein said step of selecting a scheduling sequence for communication between said access points comprises assessing traffic requirements within said cluster.

* * * * *